United States Patent

[11] 3,579,740

| | | |
|---|---|---|
| [72] | Inventor | Herbert Rees<br>Toronto, Canada |
| [21] | Appl. No. | 754,181 |
| [22] | Filed | Aug. 21, 1968 |
| [45] | Patented | May 25, 1971 |
| [73] | Assignee | Husky Manufacturing and Tool Works Ltd.<br>Toronto, Ontario, Canada |

[54] MECHANISM FOR CLOSING AND OPENING INJECTION MOLDS
12 Claims, 4 Drawing Figs.

[52] U.S. Cl. ............................................ 18/30, 91/410
[51] Int. Cl. ............................................ B29f 1/00
[50] Field of Search .................................. 18/2 (RP), 30 (LA), 30 (LV); 91/410

[56] References Cited
UNITED STATES PATENTS

| 3,191,235 | 6/1965 | Rougement | 18/30X |
| 3,315,302 | 4/1967 | Phillipson et al. | 18/2 |
| 3,363,514 | 1/1968 | Ramcke | 91/410X |

*Primary Examiner*—H. A. Kilby, Jr.
*Attorney*—Karl F. Ross

ABSTRACT: The movable platen of an injection molding machine is rigid with a nonrotatable lead screw whose rear end, remote from this platen, is engaged by a rotatable drive nut at a location beyond the tie rods on which the platen slides. The machine frame, supporting the fixed platen with reference to which the movable platen is displaceable, carries a motor which can be reversibly operated to turn the nut in either direction for respectively advancing and retracting the movable platen; a cylinder at the rear of the frame carries an axially movable piston which, upon a stopping of the motor in the mold-closed position, is brought to bear under hydraulic pressure against the nut to clamp the mold between the platens against the tie bars anchored to the frame.

MECHANISM FOR CLOSING AND OPENING INJECTION MOLDS

My present invention relates to an injection molding machine and, more particularly, to mechanism for closing and opening a split mold of two or more separable parts, two of these mold portions being respectively supported on a stationary platen and on a movable platen.

It has already been proposed (see Rougement U.S. Pat. No. 3,191,235) to reciprocate the movable platen of such a molding machine by a combination of a hydraulic drive motor and hydraulic pressure directly acting upon the platen, this direct hydraulic pressure serving to clamp the mold tightly between the two platens at the end of a forward stroke; the reciprocation of the movable platen by the hydraulic motor is effected with the aid of a lead screw engaged by a rotatable nut and secured by its front end to a piston received in a cylindrical rearward extension of the movable platen. Upon the arrival of this platen in an advanced position to close the mold, fluid pressure is applied to a front face of the piston to exert a final forward thrust upon the movable platen; this thrust is absorbed by the fixed platen and by a set of tie bars extending between the latter and the machine frame in which the motor-driven nut is journaled. The nut itself is axially slidable, to a limited extent, against a forwardly directed spring force so as to yield rearwardly in response to the mold-locking hydraulic pressure acting upon the front face of the piston.

The general object of my present invention is to provide an improved mold-closing mechanism of this type allowing greater freedom in choosing the location of a hydraulic (or, possibly, pneumatic) actuator designed to exert the final mold-locking thrust upon the movable platen.

A more particular object, allied with the preceding one, is to provide means for permitting such actuator to be disposed rearwardly of the tie bars, thus at a location where the diameter of the cylinder receiving the pressure fluid is not limited by the geometry of the movable platen and the spacing of the tie bars on the lead screw axis.

A further object is to provide a control system for properly timing the operations of the drive motor for the lead screw nut and the hydraulic or pneumatic actuator in a manner allowing the movable platen to reciprocate at high speed while minimizing its impact upon the stationary platen even if the motor is arrested only upon actual contact between the separable mold portions respectively carried thereon.

In accordance with an important feature of my invention, I dispose the fluid-pressure-operable actuator rearwardly of the lead screw nut so that its piston, in response to pressure fluid acting upon its rear face, urges the nut forwardly together with the associated lead screw for tightly clamping the mold. This arrangement eliminates the need for disposing a piston immediately adjacent the movable platen, thus between the tie bars, and allows the piston cylinder to be mounted on the machine frame rearwardly of these tie bars so that the diameter of the cylinder can be chosen independently of their position. In this way, the effective area of the piston may be made large enough to develop the requisite clamping force with a relatively low hydraulic pressure; in some instances, even the pressure of a pneumatic fluid will suffice.

The piston cylinder of the fluid-pressure-operated actuator, or a forward extension thereof, may be conveniently used as a support for the drive motor coupled with the lead screw nut which in turn may be partly or completely enveloped by this extension; the motor is preferably of the hydraulic type, although an electric motor can also be used. The otherwise unobstructed space between the motor support and the movable platen may be used to accommodate a plate which slides on the tie bars and has an array of ejector members secured thereto, these ejector members being generally in the form of rods which penetrate corresponding bores in the movable platen upon retraction of the latter and upon advance of the ejector plate under the control of a hydraulic servomotor or similar operating means.

The switchover between the drive motor and the hydraulic or pneumatic actuator is controlled by a timing circuit or programmer which preferably is designed to reduce the forward speed of the motor, and therefore that of the advancing platen, in a terminal phase of the mold-closing stroke. Thus, a first switch tripped by the platen or some other member rigid therewith (e.g. the lead screw) may act to reduce the motor speed ahead of the terminal position whereas a second switch, upon arrival of the movable platen in that position, arrests the drive motor and opens a valve for admitting pressure fluid to the rear face of the actuator piston. As the mold closes and stops the advance of the lead screw, continuing rotation of the nut (whether due to inertia or to a delayed deactivation of the drive motor) urges the latter rearwardly against its biasing force to eliminate a small clearance between two confronting contact surfaces on the nut and the piston. Thereafter, fluid pressure exerted upon the piston generates the final mold-locking thrust which elastically tensions the tie bars to generate a stored force serving to restore the aforementioned clearance at the beginning of the return stroke. A reverse fluid pressure may be applied to a forward face of the piston if the mating threads of the nut and the lead screw should jam so as to prevent the spontaneous separation of the contact surfaces.

The invention will be described in greater detail with reference to the accompanying drawing in which.

Figure 1:
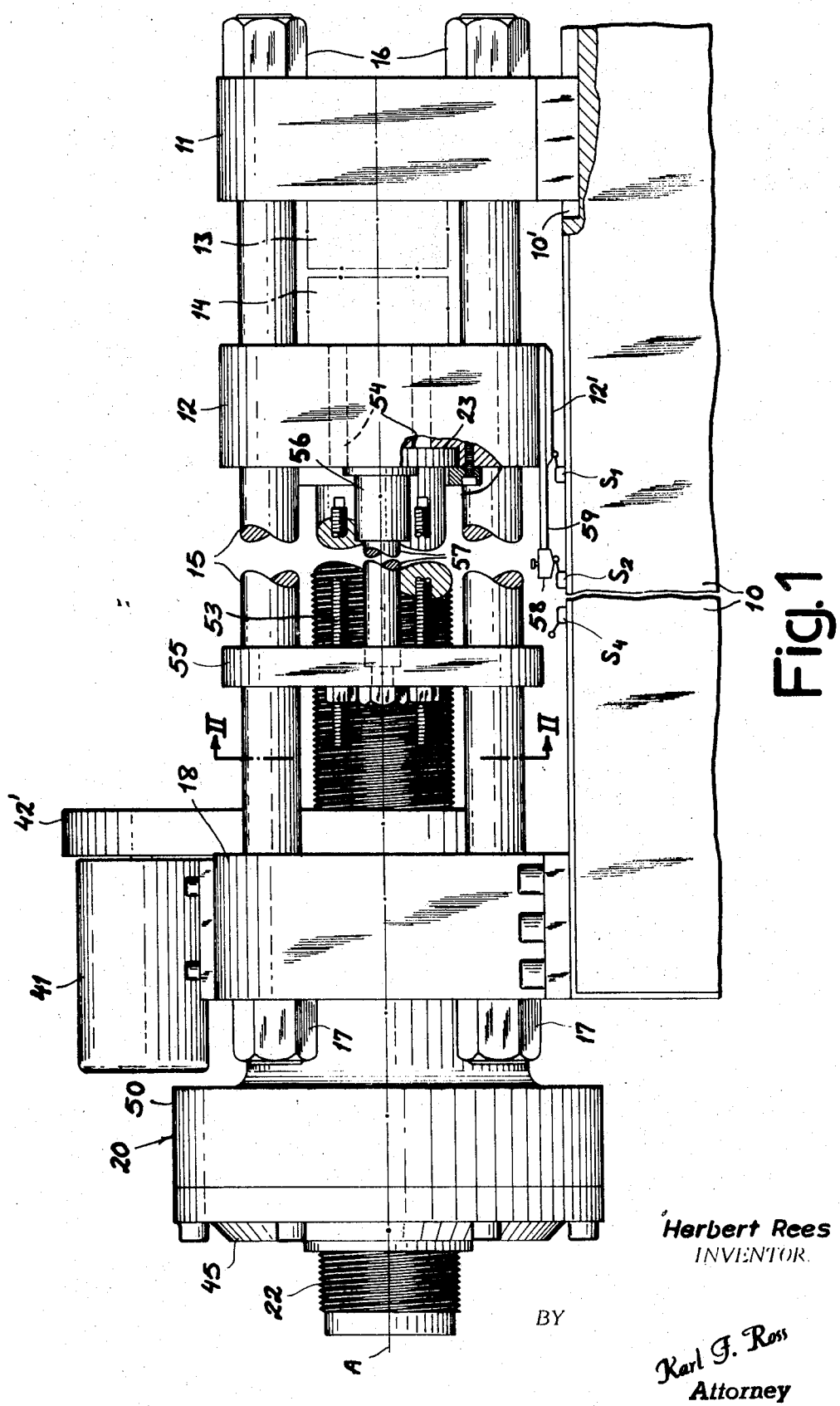
FIG. 1 is a side-elevational view of an injection molding machine embodying my present improvement.

The molding machine shown in the drawing may be of the general type disclosed in my prior U.S. Pat. Nos. 3,117,348 and 3,254,371, only so much of it being shown as is necessary for an understanding of the present invention. The machine comprises a bed 10, forming part of a frame structure, which has keyways 10' (only one shown) accommodating a substantially stationary platen 11 confronting a movable platen 12. Platens 11 and 12 support respective mold halves 13 and 14, it being understood that mold portion 13 may be mounted on platen 11 with freedom of limited axial displacement in the manner and for the purpose described in my two above-identified patents. It is also possible to insert a further mold portion between the platen-supported portions 13 and 14, e.g. as disclosed in my prior U.S. Pat. Nos. 3,328,844 and 3,383,930.

A set of tie bars 15 are anchored by nuts 16 to platen 11 and by nuts 17 to a flange 18 which is bolted to the bed 10 so as to be rigid with the machine frame. Flange 18 is part of a forward extension 19 of a hydraulic cylinder 20 receiving a piston 21 which coaxially surrounds a lead screw 22, the latter having a front end 23 nonrotatably secured to movable platen 12 for axial reciprocation therewith along the tie bars 12. A nut 24 matingly engages the lead screw 22 and is journaled in a sleeve 25, rigid with piston 21, by means of tapered roller bearings 26, 27, the outer races 26', 27' of these bearings being separated by spacer pins 28 whose length is slightly greater than the axial width of an annular inner rib 25' of sleeve 25 which accommodates the pins 28 in axially extending bores 29 thereof. Rib 25' also has several blind holes 29a receiving shorter pins 28a together with biasing springs 30 exerting a rearward thrust upon the sleeve 25 with reference to nut 24; the inner races 26", 27" of bearings 26, 27 rest against a rear shoulder 24' of nut 24 and against a pair of lock nuts 31, 32 threaded onto a cylindrical portion 24" thereof. Sleeve 25 is slidably held in cylinder extension 19 and is spaced from its inner peripheral wall by sealing rings 33, 34.

A forward extension 35 of nut 24 has a key 36 received within a keyway 37 of a collar 38 coaxial with lead screw 22 and nut 24; instead of a single key and keyway, a series of interfitting splines may be provided to facilitate relative axial displacement of members 24, 38 while coupling them for joint rotation about the lead screw axis A. With collar 38 journaled in flange 18 by means of roller bearings 39, 40, such rotation is imparted to it by a motor 41 through a chain drive 42 which, of course, is representative of any suitable transmission means including gear trains and belt drives. Transmission 42 is enclosed in a housing 42'.

The blind holes 29a serving as housings for biasing springs 30 are preferably angularly equispaced along the periphery of rib 25', as by alternating with the bores 29 accommodating the spacer pins 28.

A similar peripheral array of loading springs 43 (only one shown) tend to maintain a gap 44 between the rear face of piston 21 and the end wall 45 of cylinder 20, each spring 43 being partly encased in a cuff 46 which bears upon the piston 21 and is axially restrained by a bolt 47 to limit the forward thrust (to the right in FIGS. 1 and 3) exerted upon the piston. By the joint actions of springs 43 and 30 there is normally maintained a clearance 48 between confronting surface portions of piston 21 and nut 24, this clearance being narrower than a gap 49 separating the piston from the front wall 50 of cylinder 20. The relative axial mobility of nut 24 and sleeve 25, afforded by the aforedescribed separation of bearing races 26', 27' by a distance greater than the width of rib 25', is sufficient to permit elimination of clearance 48 in response to a forward thrust of piston 21, yet an abutment 18' on flange 18 limits the forward stroke of sleeve 25 to prevent complete closure of gap 49. Gaps 44 and 49 respectively communicate with two inlets 51, 52 leading to a source of hydraulic fluid as more fully described hereinafter with reference to FIG. 4.

Figure 2:
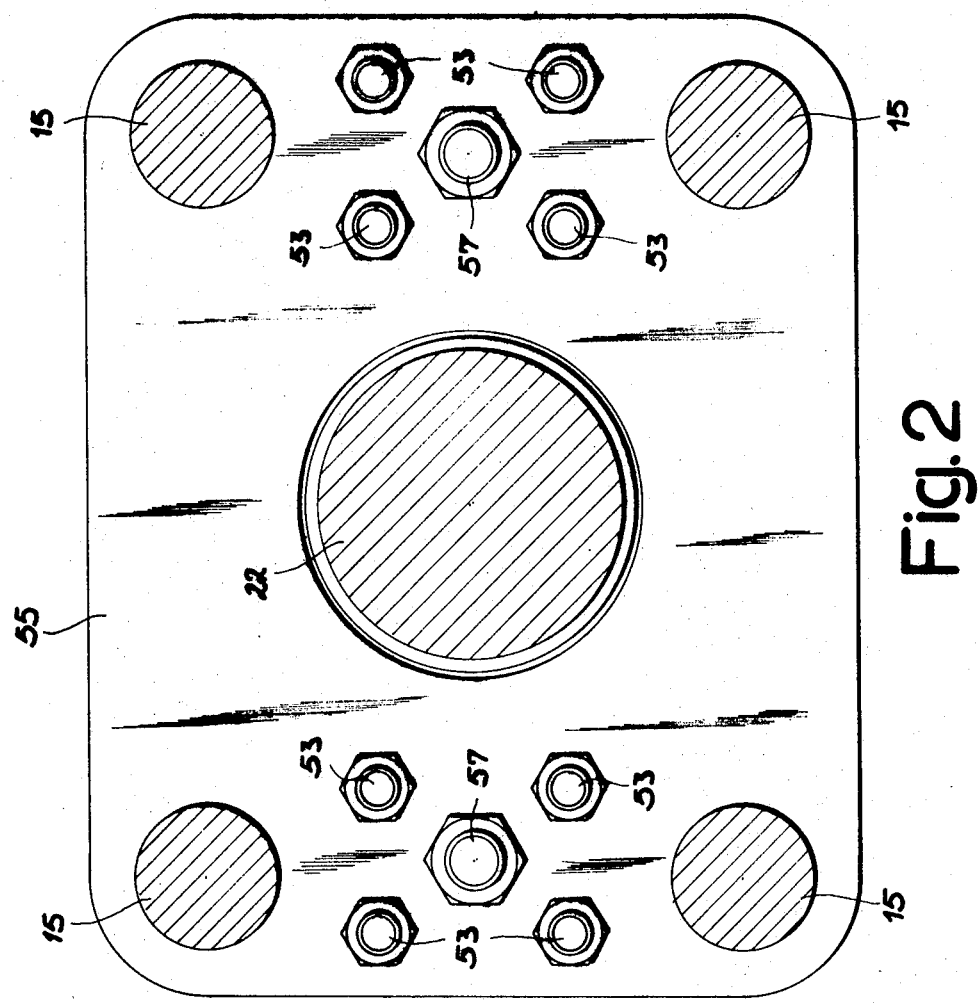
FIG. 2 is a cross-sectional view taken on the line II—II of FIG. 1.

A set of ejector rods 53, aligned with respective bores 54 in platen 12, are fastened to a plate 55 which is entrainable by this platen, along tie bars 15, and can be slid relatively thereto under the control of a pair of hydraulic servomotors 56 (only one shown) having pistons 57 secured to the plate 55, the servomotors 56 being supported on the platen 12 at opposite sides of lead screw 22 as best seen in FIG. 2.

Figure 3:
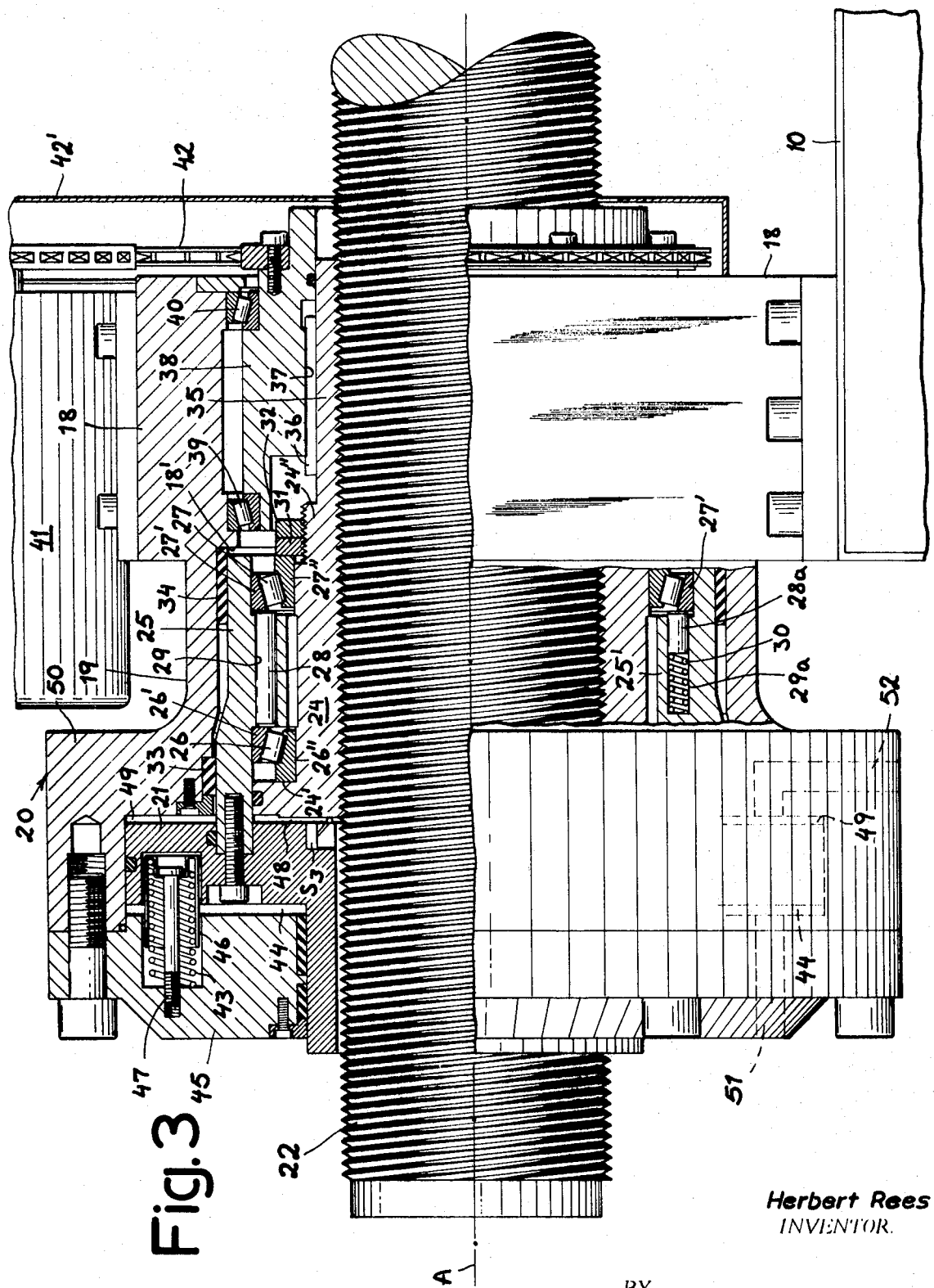
FIG. 3 is a sectional view showing part of the assembly of FIG. 1 on a larger scale.
Figure 4:
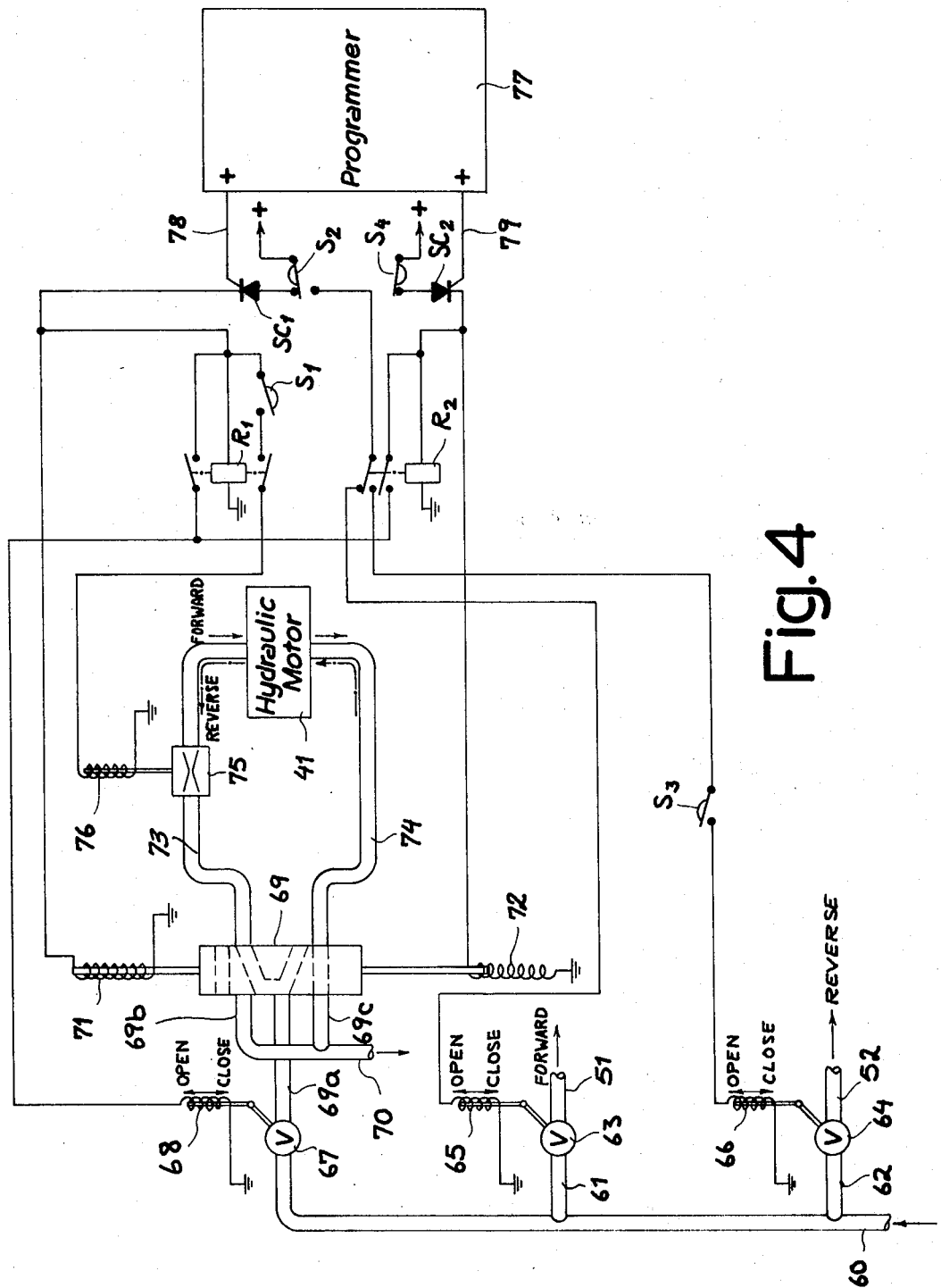
FIG. 4 is a diagram of a control system associated with the machine of FIGS. 1 and 2.

Reference will now be made to FIG. 4 for a description of an associated control system and the mode of operation of the machine shown in FIGS. 1—3. A source of hydraulic fluid, not shown, works into a pipe 60 having branches 61 and 62. These branches are connected to inlets 51 and 52 via respective valves 63, 64 controlled by solenoids 65, 66. Another valve 67, controlled by a solenoid 68, connects pipe 60 with an inlet port 69a of a distributing valve 69 having outlet ports 69b, 69c connected to a return line 70. Distributing valve 69 is under the control of two solenoids 71, 72 and leads to a pair of conduits 73, 74 terminating at opposite ports of a hydraulic motor representing the reversible drive motor 41 of FIGS. 1 and 3. A throttle valve 75 in conduit 73 is controlled by a solenoid 76.

The several valves 63, 64, 67, 69 and 75 are operated in a timed sequence by a programmer 77 with the aid of a pair of relays $R_1$, $R_2$, two controlled rectifiers $SC_1$, $SC_2$, and four switches $S_1$, $S_2$, $S_3$ and $S_4$ also illustrated in FIGS. 1 and 3. Switch $S_1$ is positioned on bed 10 so as to be tripped by a cam 12' on platen 12 as the latter approaches its terminal position at the end of its forward stroke. Switches $S_2$ and $S_4$, also mounted on bed 10, are positioned for successive operation by a cam 58 adjustably carried on a rod 59 extending from platen 12. Switch $S_3$ is disposed in a recess of piston 21 for operation by the confronting contact surface of nut 24 upon the reduction of clearance 48.

To initiate a forward stroke of the movable platen 12 at the beginning of the molding cycle, programmer 77 applies a positive timing pulse through a lead 78 to the gate of the controlled rectifier $SC_1$ which, with switch $S_2$ unoperated, actuates the relay $R_1$ to energize the solenoid 68, thereby opening the valve 67 for the admission of hydraulic fluid to distributor 69; solenoid 71, energized directly from controlled rectifier $SC_1$, directs this fluid into conduit 73 which at this instant is unthrottled, solenoid 76 being unoperated. Fluid now flows through motor 41 in a direction causing its forward rotation, returning via conduit 74 and distributor 69 to the discharge line 70. Nut 24 is rotated at high speed to advance the platen 12 rapidly toward platen 11 until its cam 12' trips the switch $S_1$, thus closing a circuit over an armature of energized relay $R_1$ to solenoid 76 whereby throttle valve 75 is rendered effective to reduce the fluid supply to motor 41. This decelerates the motor and slows the advance of platen 12 so as to lessen the impact upon closure of the mold 13, 14.

At the instant of closure, the properly set cam 58 trips the switch $S_2$ to open the energizing circuit of controlled rectifier $SC_1$, thereby releasing the relay $R_1$ and deactivating the solenoids 68 and 76. Main valve 67 is now closed and motor 41 comes to a halt, but not before the nut 24 has continued its rotation sufficiently to be driven rearwardly, by the threads of the now arrested lead screw 22, against the force of biasing springs 30 to eliminate the clearance 48. This movement trips the switch $S_3$ which, however, has no effect at that time since relay $R_2$ is operated. The reversal of switch $S_2$, however, energizes the solenoid 65 which opens the valve 63, thereby admitting fluid from line 60 to inlet 51 and gap 44 so that piston 21 is moved to the right, exerting a clamping thrust upon platen 12 through the intermediary of nut 24 and lead screw 22.

Subsequently, at an instant determined by the programmer 77, a positive pulse is applied to a second lead 79 to start the reopening of the mold within which, also under the control of the programmer, one or more plastic articles were just formed by conventional means not further illustrated. Controlled rectifier $SC_2$ is rendered conductive and, since switch $S_4$ is closed at this time, operates the relay $R_2$ so as to reenergize the solenoid 68. Solenoid 72 is energized at the same time, directly from controlled rectifier $SC_2$, to move the distributor 69 into its alternate position whereby hydraulic fluid is admitted through the reopened valve 67 into conduit 74 to drive the motor 41 in the reverse direction, the fluid returning through conduit 73 to the discharge line 70. If the nut 24 is free to rotate, it first returns to its original axial position illustrated in FIGS. 1 and 3 to restore the clearance 48 and release the switch $S_3$. If, however, a bind has developed which inhibits such rotation, switch $S_3$ remains closed so that solenoid 66 is energized to open the valve 64 whereby fluid from line 60 is admitted to inlet 52 and enters the gap 49, thereby forcibly separating the piston 21 from the nut 24. Valve 64 recloses as soon as switch $S_3$ returns to normal.

With solenoid 76 remaining unoperated throughout this reverse stroke, platen 12 is retracted at high speed into its alternate limiting position in which the cam 58 trips the switch $S_4$ to deenergize the controlled rectifier $SC_2$ and the relay $R_2$. A new cycle can then be started by another timing pulse on lead 78.

The servomotors 56 may be operated at this time, by a suitable connection to the source of hydraulic fluid and under the control of programmer 77, to advance the ejector rods 53 for the purpose of discharging molded articles remaining in mold portion 14.

If a mold of different axial length is substituted for the mold 13, 14, the cam 58 should be reset on rod 59 to trip the switch $S_2$ at the proper instant. Such resetting will also affect the position of the retracted platen 12 which, however, is not critical. Naturally, it is also possible to mount the switches $S_1$, $S_2$ and/or $S_4$ adjustably on the bed 10.

The limited axial mobility of platen 11, afforded by the keyways 10', serves only to allow a stretching of the tie bars 15 to an extent well within their elastic limit. The same effect may be had, of course, by rigidly securing the platen 11 to the bed 10 and slidably securing the mounting flange 18 to the bed, e.g. with the aid of similar keyways.

Cam 12' is representative of any profiled element whose contour determines the speed of the drive motor 41 along any part of the forward and/or reverse stroke of the movable platen. Such speed control, known per se, may of course also be used if the drive motor is of the electric rather than of the hydraulic type. These and other modifications, readily apparent to persons skilled in the art, are intended to be embraced within the spirit and scope of my invention as defined in the appended claims.

I claim:

1. In an injection molding machine comprising a frame, a substantially stationary platen on said frame adapted to support a first mold portion, a set of tie bars having forward ends anchored to said stationary platen, and a movable platen slidable along said tie bars and adapted to support a second mold portion, the combination therewith of mechanism for reciprocating said movable platen on said tie bars between an advanced position of mold closure and a retracted position of mold opening, said mechanism comprising:

a lead screw parallel to said tie bars, said lead screw having a rear end remote from said platen for axial reciprocation therewith;

a nut threadedly engaging said rear end of the lead screw, said nut being rotatably mounted on said frame with freedom of limited axial displacement relative thereto;

reversible drive means for rotating said nut to advance and retract said lead screw together with said movable platen; and actuating means operable by fluid pressure, upon deactivation of said drive means in said advanced position of said movable platen, to bear upon said nut in a forward direction for clamping said mold portions tightly between said platens, said actuating means including a cylinder mounted on said frame rearwardly of said tie bars, a piston disposed rearwardly of said nut and movable within said cylinder in axial direction of said lead screw, said piston and said nut being provided with confronting contact surfaces, and biasing means tending to maintain said contact surfaces axially separated by a small clearance, said clearance being reduced by continuing rotation of said nut upon arrestation of said lead screw in said advanced position.

2. The combination defined in claim 1 wherein said drive means includes a rotatable but axially fixed collar on said frame coaxial with said nut and keyed thereto on the side remote from said piston, and transmission means for imparting rotation to said collar.

3. The combination defined in claim 1 wherein said actuating means comprises a cylinder mounted on said frame, a piston movable within said cylinder in axial direction of said lead screw, said piston and said nut being provided with confronting contact surfaces, and biasing means tending to maintain said contact surfaces axially separated by a small clearance, said clearance being reduced by continuing rotation of said nut upon arrestation of said lead screw in said advanced position.

4. The combination defined in claim 1, further comprising resilient loading means bearing upon said piston for limiting the width of said clearance.

5. The combination defined in claim 1 wherein said actuating means includes first valve means responsive to arrival of said movable platen in said advanced position for admitting pressure fluid to a rear face of said piston substantially concurrently with deactivation of said drive means, second valve means for admitting pressure fluid to a front face of said piston substantially concurrently with reactivation of said drive means at the beginning of a retraction stroke, and switch means for disabling said second valve means upon the reestablishment of said clearance during said retraction stroke.

6. The combination defined in claim 5 wherein said switch means is disposed in said clearance for operation by one of said contact surfaces.

7. The combination defined in claim 1 wherein said cylinder has a body surrounding said piston and a forward extension enveloping said nut, said drive means being mounted at least in part on said extension.

8. The combination defined in claim 7 wherein said tie bars have rear ends secured to said extension forwardly of said body, said cylinder and said stationary platen being positioned on said frame with freedom of limited relative axial displacement permitting elastic stretching of said tie bars.

9. The combination defined in claim 8, further comprising an axially shiftable plate on said tie bars between said extension and said movable platen, an array of ejector members extending forwardly from said plate toward said movable platen for penetration thereof, and operating means for said ejector means carried by said movable platen and coupled with said plate.

10. The combination defined in claim 7 wherein said body has a radius greater than the distance of any of said tie bars from the lead screw axis.

11. The combination defined in claim 1 wherein said drive means is provided with speed control means for slowing the advance of said movable platen in a terminal phase of its forward stroke.

12. In an injection molding machine comprising a frame, a substantially stationary platen on said frame adapted to support a first mold portion, a set of tie bars having forward ends anchored to said stationary platen, and a movable platen slidable along said tie bars and adapted to support a second mold portion, the combination therewith of mechanism for reciprocating said movable platen on said tie bars between an advanced position of mold closure and a retracted position of mold opening, said mechanism comprising:

a lead screw parallel to said tie bars, said lead screw having a rear end remote from said platens and a front end nonrotatably secured to said movable platen for axial reciprocation therewith;

a nut member threadedly engaging said lead screw, said nut member being rotatably mounted on said frame with freedom of limited axial displacement relative thereto;

reversible drive means for rotating said nut member to advance and retract said lead screw together with said movable platen;

actuating means operable by fluid pressure, upon deactivation of said drive means in said advanced position of said movable platen, to bear upon said nut member in a forward direction for clamping said mold portions tightly between said platens, said actuating means including a cylinder mounted on said frame, a piston member movable within said cylinder in axial direction of said lead screw, said piston and nut members being provided with confronting contact surfaces, and biasing means tending to maintain said contact surfaces axially separated by a small clearance, said clearance being reduced by continuing rotation of said nut upon arrestation of said lead screw in said advanced position;

switch means on one of said members responsive to the proximity of the other of said members for generating a signal indicating a substantial reduction of said clearance; and fluid pressure means controlled by said switch means upon reversal of said drive means in said advanced position for restoring said clearance preparatorily to retraction of said lead screw.